US010957469B2

(12) United States Patent
D'Agostino et al.

(10) Patent No.: US 10,957,469 B2
(45) Date of Patent: Mar. 23, 2021

(54) HIGH VOLTAGE THREE-PHASE CABLE

(71) Applicant: PRYSMIAN S.p.A., Milan (IT)

(72) Inventors: Bartolomeo D'Agostino, Milan (IT); Massimo Bechis, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 16/530,727

(22) Filed: Aug. 2, 2019

(65) Prior Publication Data

US 2020/0043633 A1 Feb. 6, 2020

(30) Foreign Application Priority Data

Aug. 3, 2018 (IT) .......................... 102018000007853

(51) Int. Cl.
*H01B 7/17* (2006.01)
*H01B 9/02* (2006.01)

(52) U.S. Cl.
CPC ............... *H01B 9/027* (2013.01); *H01B 7/17* (2013.01)

(58) Field of Classification Search
CPC .................................. H01B 9/027; H01B 7/17
USPC ....................................................... 174/128.2
See application file for complete search history.

(56) References Cited

U.S. PATENT DOCUMENTS

| | | | | | |
|---|---|---|---|---|---|
| 1,199,789 A | * | 10/1916 | Hochstadter | ........... | H01B 7/226 174/106 R |
| 1,231,568 A | * | 7/1917 | Clark | ..................... | H01B 11/04 174/113 R |
| 1,370,731 A | * | 3/1921 | Chase | ...................... | H01B 7/26 174/103 |
| 1,822,737 A | * | 9/1931 | Karapetoff | ............... | H01B 9/04 307/147 |
| 1,959,526 A | * | 5/1934 | Del Mar | ................ | H01B 13/00 57/7 |
| 2,083,889 A | * | 6/1937 | Wyatt | ...................... | H01B 7/28 174/116 |

(Continued)

FOREIGN PATENT DOCUMENTS

CN 203433855 U 2/2014
CN 206907553 U 1/2018

(Continued)

OTHER PUBLICATIONS

Italian Search Report, dated Mar. 21, 2019, for Italian Application No. 201800007853, 2 pages.

*Primary Examiner* — Timothy J Thompson
*Assistant Examiner* — Michael F McAllister
(74) *Attorney, Agent, or Firm* — Seed IP Law Group LLP

(57) ABSTRACT

High voltage three-phase cable comprising three cores positioned so as to assume the configuration with minimum radial dimension and a sheath surrounding the three cores, wherein each core comprises an electric conductor having a substantially triangular shaped cross section with vertex portions and edges; an insulating system surrounding the electric conductor, the insulating system comprising an inner semiconducting layer surrounding the electric conductor, an insulating layer surrounding and in contact with the inner semiconducting layer and an outer semiconducting layer surrounding and in contact with the insulating layer, the layers of the insulating system being made of an extruded polymeric material having a dielectric constant ε comprised from 2 to 2.5; and a metallic screen surrounding the insulating system.

15 Claims, 3 Drawing Sheets

(56) References Cited

U.S. PATENT DOCUMENTS

| | | | | | |
|---|---|---|---|---|---|
| 2,112,322 | A * | 3/1938 | Wyatt | | H01B 9/00 |
| | | | | | 174/14 R |
| 2,123,746 | A * | 7/1938 | Rost | | H01B 7/0208 |
| | | | | | 428/373 |
| 2,190,017 | A * | 2/1940 | Del Mar | | H01B 9/0611 |
| | | | | | 174/25 R |
| 2,229,680 | A * | 1/1941 | Somes | | H05B 6/02 |
| | | | | | 219/644 |
| 3,441,660 | A * | 4/1969 | Garner | | H01B 9/00 |
| | | | | | 174/102 SC |
| 3,914,532 | A * | 10/1975 | Dyba | | H01B 7/02 |
| | | | | | 174/119 R |
| 5,732,875 | A * | 3/1998 | Ziemek | | H01B 13/2633 |
| | | | | | 174/129 R |
| 7,696,430 | B2 * | 4/2010 | Santos Lopez | | H01B 9/006 |
| | | | | | 174/110 R |
| 2002/0134533 | A1 * | 9/2002 | Bechis | | H02G 15/34 |
| | | | | | 165/104.19 |
| 2012/0205137 | A1 * | 8/2012 | Fjellner | | F16L 11/22 |
| | | | | | 174/116 |
| 2014/0049786 | A1 * | 2/2014 | Knuepfer | | G01B 11/02 |
| | | | | | 356/634 |
| 2015/0206629 | A1 * | 7/2015 | Ona | | H02G 9/06 |
| | | | | | 174/24 |
| 2016/0005508 | A1 * | 1/2016 | Maclean | | H01B 7/046 |
| | | | | | 174/99 R |
| 2016/0172077 | A1 * | 6/2016 | Maioli | | H01B 7/04 |
| | | | | | 174/108 |

FOREIGN PATENT DOCUMENTS

| | | |
|---|---|---|
| GB | 2 113 453 A | 1/1982 |
| WO | 2016/034243 A1 | 3/2016 |

* cited by examiner

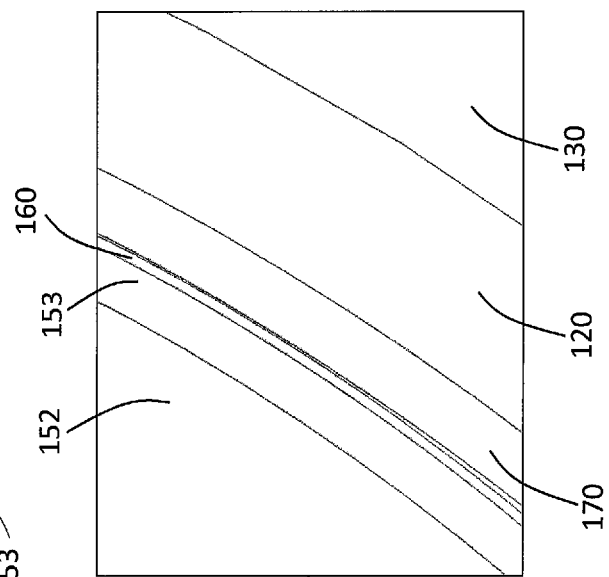
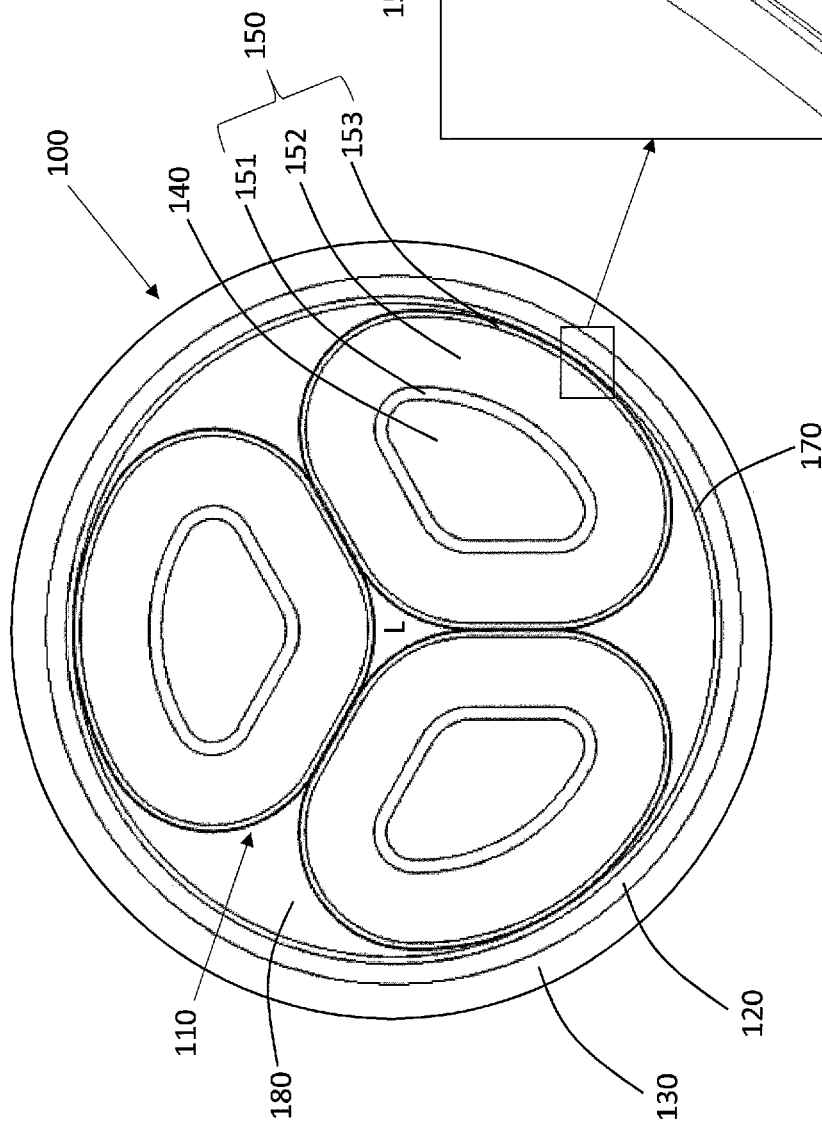

HIGH VOLTAGE THREE-PHASE CABLE

BACKGROUND

Technical Field

The present disclosure refers to a high voltage three-phase cable.

Description of the Related Art

In this specification, the expression "high voltage" (HV) indicates voltages equal or greater than 30 kV, and lower than 300 kV, the expression "medium voltage" (MV) indicates voltages of from 1 kV to 30 kV, and the expression "low voltage" (LV) indicates voltages of lower than 1 kV.

As it is known, the high voltage electricity distribution network infrastructures can comprise a plurality of pipes within which HV cables are installed and which can be buried into the ground in urban areas as for example in the city centers.

The need of modernization of the distribution networks for increasing the capacity of transporting electric energy and guaranteeing high safety standards demands the substitution of the HV cables and the relative pipes.

However, in this regard, the use of retrofit projects are currently growing in order to avoid the difficult and complex replacement of the pipes, since these projects provide the installation of new HV cables inside existing pipes.

HV three-phase cables generally include three cable cores, each one usually formed by an electrically conductive metal conductor having a circular cross-section and covered by an extruded insulation system. Such HV cable cores include also a metal screen surrounding each insulation system. HV three-phase cables can comprise a water barrier and an armour.

The dimensions of the pipes can be smaller than the new HV cable cross section or, anyway, not sufficiently larger to provide a gap between cable outer diameter and internal diameter of the pipe suitable for a convenient and harmless cable deployment.

There is the need to create more compact HV cables to fit easily into the pipe.

Sector conductors are known to allow building cables with an outer diameter smaller than those comprising conductors with circular cross section, and thus easier to be pulled through existing pipes, as described, for example, in U.S. Pat. No. 5,732,875.

Each sector conductor has a substantially triangular shape extending, for a three-phase cable, over 120° thus forming a sector of a circle.

U.S. Pat. No. 5,732,875 discloses a method for producing a sector conductor for electric power cables, where "power cables" are low, medium and high-voltage cables with plastic-insulated conductors. The sector conductor can therefore be used for higher voltage power cables, with a corresponding insulation sheath.

EP 1418595 relates to a metallic conductor composed of a plurality of wires which adopts a predetermined polygonal cross-section. Each conductor was enveloped in a layer of an insulating thermoplastic or thermosetting polymeric material such as polyethylene, polyester, fluorinated polymer, polyolefin, polyamide, polyimide, polyurethane, polyvinyl chloride, thermos-plastic elastomer, ethylene-propylene, polychloroprene or silicone rubber to maintain the predetermined cross-section that was imparted to it by a mechanical means of deformation.

GB 1387660 relates to a low voltage power cable comprising four conductors each of sector-shaped cross-section and each consisting of a plurality of compressed cores. The cores of each of the four conductors 1 to 4 are contained in individual sheaths of electrically insulating plastics material, and the conductors are all enclosed by a common plastics material sheath.

U.S. Pat. No. 3,914,532 states that sector cables, also known as segmental conductor cables, are relied upon in systems with voltage ratings from 5,000 to 500,000 volts. In particular, a sector cable comprises an outer protector covering, usually of a polymeric material, which overlies a lead sheath. Immediately under sheath is a semiconducting carbon black tape intercalated with a copper shielding tape. The copper shielding tape, in turn, is placed over cable insulation (usually paper) which is placed about strand shield. Conductor segments are covered with three layers of material in forming the insulation covering. It is an essential feature that all three layers of the insulation covering must be of uncreped paper.

BRIEF SUMMARY

The Applicant has faced the problem of exploiting the advantage of a sector conductor cable having an outer diameter smaller than that of a round conductor cable having substantially the same conductor cross section and substantially the same current capacity.

A sector conductor with a substantially triangular shape has three vertex portions with small curvature radii where charge accumulation occurs. While in the case of LV and MV cable, the charge accumulation results in an electric field gradient easily contained by the insulating layer, in the case of HV cable, the electric field generated at the conductor vertex portions (ranging, for example, from 6 kV/mm to 14 kV/mm) can be as high as to cause the insulating system perforation.

The Applicant has found that the above problem can be solved by making a three-core cable wherein each core comprises an electric conductor with a substantially triangular shaped cross-section surrounded by an insulating system made of an extruded polymeric material with a dielectric constant comprised from 2 to 2.5.

The Applicant has found that such an insulating system is capable of bearing high electric field gradient without having its performance impaired even at the substantially angular portions.

Furthermore, the Applicant has observed that the metallic screen surrounding the insulating system of each core may be used to protect each core against any mechanical stresses and/or against the penetration of water and to discharge towards the electric ground possible short circuit currents.

Therefore, according to a first aspect, the present disclosure relates to a high voltage three-phase cable comprising:
three cores positioned so as to assume the configuration with minimum radial dimension; and
a sheath surrounding the three cores,
wherein each core comprises:
an electric conductor having a substantially triangular shaped cross-section with vertex portions and edges;
an insulating system surrounding the electric conductor, the insulating system comprising an inner semiconducting layer surrounding the electric conductor, an insulating layer surrounding and in contact with the inner semiconducting layer and an outer semiconducting layer surrounding and in contact with the insulating layer, the layers of the insulating system being made of an extruded polymeric material having a dielectric constant ε comprised from 2 to 2.5; and
a metallic screen surrounding the insulating system.

In an embodiment of the present disclosure, the extruded polymeric material is substantially devoid of contaminant particles with a size greater than 200 μm when measured in accordance to ICEA S-94-649-2013, Appendix J.

As apparent to a skilled person, the vertex portion of each electric conductor and, accordingly, of the insulating system surrounding it are rounded. This feature and the radius of rounded vertex portion depends upon various factors, for example upon the manufacturing apparatus.

The three electric conductors of the cable are positioned so that a first vertex portion thereof converges towards the longitudinal axis of the high voltage three-phase cable, while second vertex portions thereof are in a radially outer position with respect to the first vertex portion.

In an embodiment, in each electric conductor, the second vertex portions are connected to each other by a major edge and each second vertex portion is connected to the first vertex portion by a respective minor edge.

In a further embodiment, each electric conductor of the cable has a cross-section which is substantially an isosceles triangle where the first vertex portion defines an angle larger than those defined by the second vertex portions, and the major edge is longer than the minor two edges.

This particular shape of the electric conductors and their arrangement allows to reduce even more the dimensions of the cable.

In an embodiment, the insulating system of the present cable has a substantially constant thickness.

Alternatively, the insulating system has a thickness variable around the electric conductor cross-section. The thickness of the insulating system has variations substantially constant along the cable length.

In an embodiment, the thickness of the insulating system is greater at the vertex portions of the electric conductor cross-section than at the edges thereof.

In another embodiment, the thickness of the insulating system is greater at the second vertex portions than at the first vertex portion.

In a further embodiment, the thickness of the insulating system is greater at the major edge than at the minor edges.

In this way, the thickness of the insulating system is optimized and takes into account that the electric field gradient depends on the shape of the different portions of the electric conductors. In fact, Applicant found that the electric field gradient that may arise at radially outer parts of the insulating system is higher than that possibly arising in parts neighbouring the cable longitudinal axis.

In an embodiment, the metallic screen can be made of an electrically conductive metal such as copper or aluminium, in form, for example, of braids, wires, helically wound tape or longitudinally folded tape. When the metallic screen is in form made of a longitudinally folded tape, optionally welded, it can act as water-barrier, too.

In an embodiment, the HV cable of the disclosure is suitable for carrying current at 30-220 kV.

In an embodiment, the extruded polymeric material of the present cable is substantially devoid of contaminant particles with a size greater than 200 μm when measured in accordance to ICEA S-94-649-2013, Appendix J, and the cable is suitable for carrying current at 60-220 kV. This allows minimizing the insulating system thickness.

It is apparent to the skilled person that the thickness of the insulating system can be calculated as a function of the voltage to be carried.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

As "insulating layer" it is meant a layer made of a material having a conductivity comprised between $10^{-16}$ and $10^{-14}$ S/m.

As "semiconductive layer" it is meant a layer made of a material having a conductivity comprised between $10^{-1}$ and 10 S/m.

As "radially outer" it is meant that an element or a portion of an element is radially farther from the cable longitudinally axis than another element or a portion of an element.

BRIEF DESCRIPTION OF THE SEVERAL VIEWS OF THE DRAWINGS

Further characteristics will be apparent from the detailed description given hereinafter with reference to the accompanying drawings, in which:

FIG. 1a is a schematic cross-sectional views of a HV cable according to the first embodiment of the present disclosure;

FIG. 1b is a schematic view of a detail of FIG. 1a;

DETAILED DESCRIPTION

Figure 2:
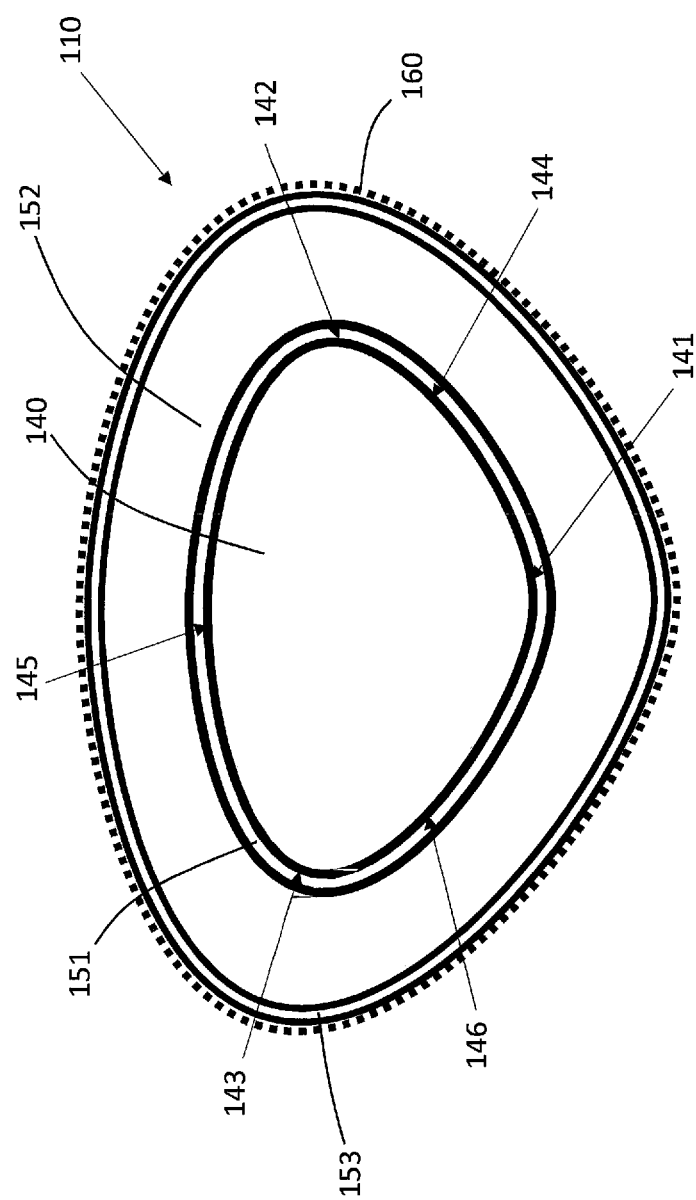
FIG. 2 is a schematic cross-sectional view of a core of a HV cable according to a first embodiment of the present disclosure.

A HV three-phase cable 100 according to a first embodiment of the present disclosure is shown in FIG. 1 and has a longitudinal axis L.

The HV three-phase cable 100 comprises three cores 110.

Each core 110 comprises an electric conductor 140, an insulating system 150 comprising an inner semiconducting layer 151 surrounding the electric conductor 140, an insulating layer 152 surrounding and in contact with the inner semiconducting layer 151, and an outer semiconducting layer 153 surrounding and in contact with the insulating layer 152.

A semiconductive water-swellable tape (not illustrated) may be present between the electric conductor 140 and the inner semiconducting layer 151.

In an embodiment, the electric conductors 140 are made of copper or aluminium, in form of rod or bundled wires. For example, the electric conductors 140 are made of wires of class 1 or of class 2 according to IEC 60228 (2004).

When electric conductors 140 are made in form of rod or bundled wires, no metal tape surrounding the wires is necessary for keeping the electric conductor 140 in shape.

A metallic screen 160 (visible in FIG. 1b which is an enlarged view of a portion of FIG. 1a) is provided to surround the insulating system 150.

The cores 110 are positioned so as to assume the configuration with minimum radial dimension. This can entail the cores 110 to be in direct contact with one another, though not necessarily. Moreover, in this configuration the metallic screens 160 result to be equipotential.

In an embodiment, the space between the three cores 110 can be filled with a bedding of polymeric material in form of extruded filler, shaped filler or threads.

In an embodiment, at least one optical fiber and/or at least one ground wire can be positioned in the space between the three cores 110.

In the present embodiment, the power cable 100 further comprises a semiconductive tape 170 around the three cores 110 and a metal water barrier 120 surrounding it.

The semiconductive tape 170 can be made in polyester or in nonwoven fabric, and charged with a semiconductive material such as carbon black, and, optionally, with water-swellable material such as superabsorbent powder.

The semiconductive tape 170 can have a cushioning function while maintaining the electric contact between the screen of the cable core, and also a water blocking function in the case it contains water-swellable material.

A bedding 180 fills the portions between the semiconductive tape 170 and the cores 110.

The metal water barrier 120 can be made of aluminium or copper. It can be in form of a longitudinally folded foil, welded around the cable cores 110 to form a tube.

In radial external position to the metal water barrier 120, a sheath 130 is provided and can be made of polymeric material like high-density polyethylene.

In radial internal position with respect to the sheath 130, an armour (not illustrated) can be present. This armour can be made of a layer of steel wires, for example flat steel wires.

As detailed in FIG. 2, an electric conductor 140 has a substantially triangular shaped cross-section with vertex portions 141, 142, 143 and edges 144, 145, 146.

In particular, the vertex portions 141, 142, 143 approximately define angular portions and the edges 144, 145, 146 can be substantially linear or curvilinear with a curvature radius substantially greater than those of the vertex portions 141, 142, 143.

In the illustrated embodiments, an electric conductor 140 has a first vertex portion 141 pointing towards the longitudinal axis L of the high voltage three-phase cable, while second vertex portions 142, 143 are in a radially outer position. In each electric conductor 140, the second vertex portions 142, 143 are connected by a major edge 145 and each second vertex 142, 143 portion is connected to the first vertex portion 141 by a respective minor edge 144, 146.

In the embodiment of FIG. 1a, the three cores 110 are positioned so that the respective first vertex portions 141 face one to each other and converge towards the longitudinal axis L of the HV cable.

According to the present disclosure, the layers of the insulating system 151, 152, 153 are made of an extruded polymeric material having a dielectric constant comprised from 2 to 2.5.

In an embodiment, a filler, e.g., carbon black, is added into the extruded polymeric material of layers 151, 153 to make the two layers 151, 153 exhibit semiconducting properties. The dielectric constant of the polymeric material of the semiconducting layers 151, 153 can still be evaluated after separating the polymer material from the filler. Other dopants or impurities may also be introduced into the extruded polymeric material of the layers 151, 153 to change the electrical properties of the layers 151, 153 from dielectric to semiconducting.

Extruded polymeric materials suitable for the insulating system of the present cable can be selected from cross-linkable polymeric materials. Such materials generally comprises a polyolefin, for example an ethylene homopolymer or copolymer of ethylene with at least one alpha-olefin $C_3$-$C_{12}$, having a density from 0.910 g/cm$^3$ to 0.970 g/cm$^3$, for example from 0.915 g/cm$^3$ to 0.940 g/cm$^3$.

In an embodiment, the polymeric material suitable for the insulating system of the present cable has a tan δ of from $10^{-3}$ to $10^{-4}$.

In an embodiment, the ethylene homopolymer or copolymer is selected from: low density polyethylene (LDPE) and linear low density polyethylene (LLDPE) having a density from 0.910 g/cm$^3$ to 0.926 g/cm$^3$.

The polyolefin can be crosslinked by reaction with an organic peroxide, such as: dicumyl peroxide, t-butyl cumyl peroxide, 2,5-dimethyl-2,5-di(t-butylperoxy)-hexane, di-t-butyl peroxide, or mixtures thereof.

Alternatively, extruded polymeric materials suitable for the insulating system of the present cable can be selected from thermoplastic polymeric materials. In an embodiment, the thermoplastic polymeric material is selected from propylene homopolymers or copolymers of propylene with at least one α-olefin, possibly in admixture with at least one copolymer of ethylene with at least one α-olefin. In an embodiment, the thermoplastic material is in admixture with a dielectric fluid. The dielectric fluid may be selected from mineral oils, for example, naphthenic oils, aromatic oils, paraffinic oils, for example, alkyl benzenes, aliphatic esters; or mixtures thereof.

Suitable thermoplastic polymeric materials for the electrically insulating layer are described, e.g., in WO 02/03398, WO 04/066318, WO 07/048422, WO2011/092533 and WO2013/171550.

Extruded polymeric materials suitable for the insulating system of the present cable, either crosslinked or thermoplastic, may further comprise an effective amount of one or more additives, selected, e.g., from: antioxidants, heat stabilizers, voltage stabilizers, water-tree retardants, processing aids, antiscorching agents, and/or inorganic fillers.

In an embodiment, the extruded polymeric material is substantially devoid of contaminant particles with a size greater than 200 μm according to the measurement protocol ICEA S-94-649-2013, Appendix J.

The expression "substantially devoid of contaminant particles with a size greater than 200 μm" means that the number of such contaminants per kg of the extruded polymeric material is equal to 1 or less.

In the first embodiment of the present disclosure illustrated in FIGS. 1 and 2, the thickness of the insulating system 151, 152, 153 is substantially constant.

In this case the cores 110 have substantially the same shape of the electric conductors 140.

Figure 3B:
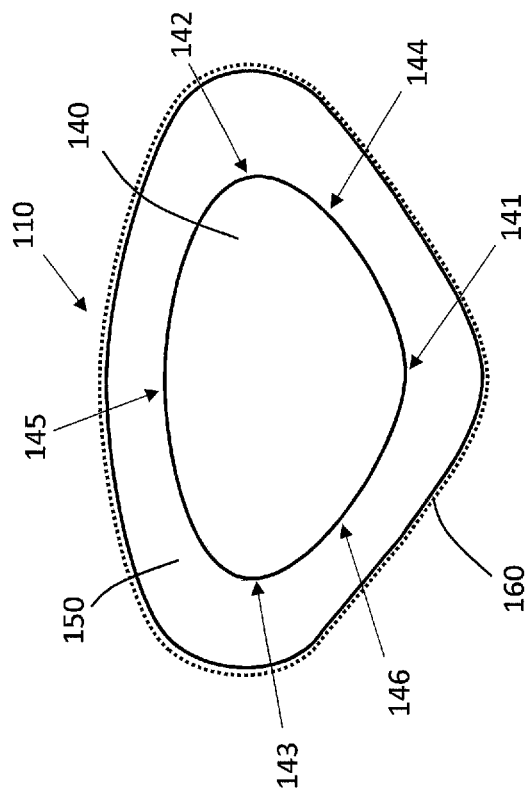
FIGS. 3a and 3b are schematic cross-sectional views of the cores of two HV cable according to two embodiments of the present disclosure, compared with one another.
Figure 3A:
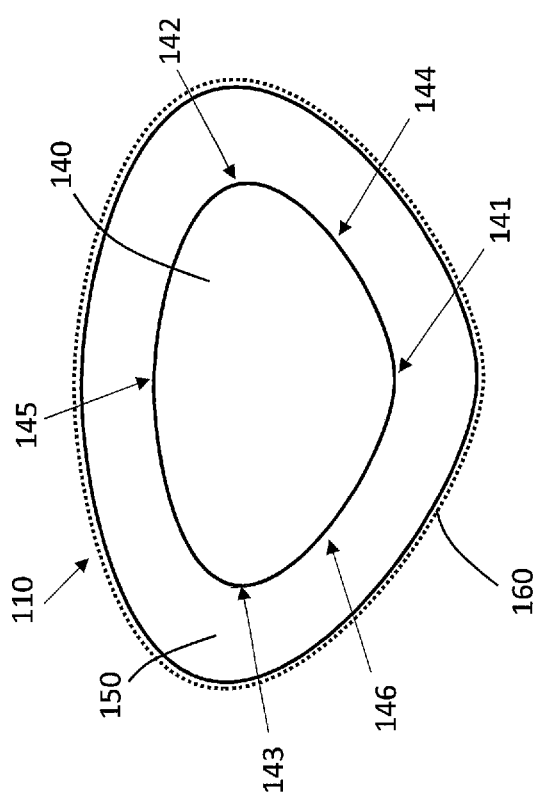

FIGS. 3a and 3b provide a comparison between the first embodiment and a second embodiment of the present disclosure. FIGS. 3a and 3b show two cores 110 where the insulating system is sketched as a single structure 150, but in view of the generally very small thickness of the semiconductive layers, it can also be assumed to be the insulating layer 152.

While the thickness of the insulating system 150 of FIG. 3a (first embodiment) is substantially constant, the thickness of the insulating system 150 of FIG. 3b (second embodiment) is variable around the electric conductor cross-section.

In particular, the thickness of the insulating system 150 is greater at the vertex portions 141, 142, 143 of the electric conductor 140 than at the edges 144, 145, 146 thereof.

In a further embodiment, the thickness of the insulating system 150 is greater at the second vertex portions 142, 143 than at the first vertex portion 141. In a further embodiment, the thickness of the insulating system 150 is greater at the major edge 145 that at the minor edges 144, 146.

For example, while the thickness of the insulating layer 152 of the core 110 of FIG. 3a is of 12 mm all around the conductor cross-section, the thickness of the insulating layer 152 of the core 110 of FIG. 3b at the second vertex portions 142, 143 is of 12 mm, at the first vertex portion 141 it is of 10.3 mm, at the major edge 145 is of 7.8 mm, and at the minor edges 144, 146 is of 7.1 mm.

The above mentioned thickness values result in a maximum electric gradient of 12.2 kV/mm and a capacitance of 228.1 pF for the core 110 of FIG. 3a, and in a gradient of 12.4 kV/mm and a capacitance of 259.1 pF for the core 110 of FIG. 3b transporting 150 kV.

In an embodiment, the cable of the present disclosure can further comprise one or more optical fibers positioned, for example, along the cable longitudinal axis L and/or in the space between the three cores and the water barrier (or the semiconductive tape, if any).

In an embodiment, each core of the cable of the present disclosure can further comprise a water-swellable tape between the insulating system 150 and the metallic screen 160. For example, the water-swellable tape can be made of materials similar to those disclosed for the semiconductive tape between the electric conductor 140 and the inner semiconducting layer 151, and/or the semiconductive tape 170.

In an embodiment, the metallic screen 160 is made as a welded metallic sheet wound around the insulating system 151, 152, 153 of each core 110; in this case, the metallic screen 160 results to be a barrier against the water.

Alternatively, the metallic screen 160 can be made as an overlapped metallic sheet or as a metallic tape.

For example, the metallic screen 160 is made of aluminium or copper.

In order to understand the advantageous compactness that can be obtained by the HV three-phase cable according to the present disclosure, an example embodiment of cable for carrying current at 150 kV will be described in the following.

The cores had a substantially triangular shaped cross-section. The thickness of the inner semiconducting layer was 2.2 mm, the thickness of the insulating layer was 12 mm, the thickness of the outer semiconducting layer was 1 mm. The metallic screen was a copper helical tape having a thickness of 0.2 mm. An aluminium water barrier (also acting as armour against mechanical stress) had a thickness of 1 mm. The sheath was made of polyethylene and had a thickness of 3.5 mm.

The diameter of this HV three-phase cable was 121 mm with each conductor dimensions of 21.65×38.38 mm in cross-section, and its weight was about 23 Kg/m.

In comparison, a HV three-phase cable for carrying current at 150 KV and having electric conductors with circular cross-section with a diameter of 26 mm each had a diameter of about 136 mm and a weight of 23,274 Kg/m. Such cable had an inner semiconducting layer 0.9 mm thick, an insulating layer is 11.78 mm thick, an outer semiconducting layer 0.9 mm thick. The metallic screen was a copper helical tape having a thickness of 0.2 mm. An armor made of 88 steel flat wires had a thickness of 4 mm. The sheath was made of polyethylene and had a thickness of 2.55 mm.

In light of the above it is evident that for the same electric current transport capacity the HV three-phase cable according to the present disclosure results to be lighter and to have a smaller diameter than the known HV three-phase cable, while having an insulating system thicker than that of the comparative cable, thus ensuring a better electric protection to the conductors.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A three-phase cable, comprising:
three cores positioned to have each a minimized radial dimension toward a longitudinal axis of the cable; and
a sheath surrounding the three cores;
wherein each core comprises:
an electric conductor having a substantially triangular shaped cross section with vertex portions and edge portions;
an insulating system surrounding the electric conductor, the insulating system comprising an inner semiconducting layer surrounding the electric conductor, an insulating layer surrounding and in contact with the inner semiconducting layer and an outer semiconducting layer surrounding and in contact with the insulating layer, the layers of the insulating system being made of an extruded polymeric material having a dielectric constant c comprised from 2 to 2.5; and
a metallic screen surrounding the insulating system;
wherein each electric conductor has a first vertex portion converging towards the longitudinal axis of the cable and two second vertex portions in a radially outer position with respect to the first vertex portion, and a thickness of the insulating system is greater at each of the second vertex portions than at the first vertex portion configured to accommodate that an electric field gradient at each of the second vertex portions is greater than an electric field gradient at the first vertex portion.

2. The three-phase cable according to claim 1, wherein the extruded polymeric material is substantially devoid of contaminant particles with a size greater than 200 μm as measured in accordance to ICEA S-94-649-2013, Appendix J.

3. The three-phase cable according to claim 1, wherein the cross-section of the electric conductor is substantially an isosceles triangle.

4. The three-phase cable according to claim 1, wherein the thickness of the insulating system is greater at the vertex portions of the electric conductor cross-section than at the edge portions thereof.

5. The three-phase cable according to claim 1, wherein each electric conductor has a first edge portion extending between the two second vertex portions and two second edge portions each extending between one of the two second vertex portions and the first vertex portion; and wherein the thickness of the insulating system is greater at the first edge portion than at each of the two second edge portions.

6. The three-phase cable according to claim 1, wherein the metallic screen is in form made of a longitudinally folded tape.

7. The three-phase cable according to claim 1, wherein the electric conductors are in form of bundled wires, the bundled wires being of class 1 or of class 2 according to IEC 60228 (2004).

8. The three-phase cable according to claim 1, wherein the thickness of the insulating system at each of the second vertex portions is approximately 12 mm and the thickness of the insulating system at the first vertex portion is approximately 10.3 mm.

9. A high voltage three-phase cable, comprising:
three cores positioned to have each a minimized radial dimension toward a longitudinal axis of the cable; and
a sheath surrounding the three cores;
wherein each core comprises:
an electric conductor having a substantially triangular shaped cross section with vertex portions and edge portions;
an insulating system surrounding the electric conductor, the insulating system comprising an inner semiconducting layer surrounding the electric conductor, an insulating layer surrounding and in contact with the inner semiconducting layer and an outer semiconducting layer surrounding and in contact with the insulating layer, the layers of the insulating system being made of an extruded polymeric material having a dielectric constant c comprised from 2 to 2.5; and
a metallic screen surrounding the insulating system;
wherein each electric conductor includes a first edge portion distal to the longitudinal axis of the cable and two second edge portions each proximal to the longitudinal axis of the cable, and a thickness of the insulating system is greater at the first edge portion than at each of the second edge portions; and
wherein each electric conductor has a first vertex portion converging towards the longitudinal axis of the cable and two second vertex portions in a radially outer position with respect to the first vertex portion, and wherein the thickness of the insulating system is greater at each of the second vertex portions than at the first vertex portion configured to accommodate that an electric field gradient at each of the second vertex portions is greater than an electric field gradient at the first vertex portion.

10. The high voltage three-phase cable according to claim 9, wherein the extruded polymeric material is substantially devoid of contaminant particles with a size greater than 200 μm as measured in accordance to ICEA S-94-649-2013, Appendix J.

11. The high voltage three-phase cable according to claim 9, wherein the cross-section of the electric conductor is substantially an isosceles triangle.

12. The high voltage three-phase cable according to claim 9, wherein the thickness of the insulating system is greater at the vertex portions of the electric conductor cross-section than at the edge portions thereof.

13. The high voltage three-phase cable according to claim 9, wherein the metallic screen is in form made of a longitudinally folded tape.

14. The high voltage three-phase cable according to claim 9, wherein the electric conductors are in form of bundled wires, the bundled wires being of class 1 or of class 2 according to IEC 60228 (2004).

15. The high voltage three-phase cable according to claim 9, wherein the thickness of the insulating system at the first edge portions is approximately 7.8 mm and the thickness of the insulating system at each of the second edge portions is approximately 7.1 mm.

* * * * *

UNITED STATES PATENT AND TRADEMARK OFFICE
CERTIFICATE OF CORRECTION

| | |
|---|---|
| PATENT NO. | : 10,957,469 B2 |
| APPLICATION NO. | : 16/530727 |
| DATED | : March 23, 2021 |
| INVENTOR(S) | : Bartolomeo D'Agostino et al. |

It is certified that error appears in the above-identified patent and that said Letters Patent is hereby corrected as shown below:

In the Claims

<u>Column 8, Claim 1, Line 48:</u>
"constant c comprised from 2 to 2.5; and" should read, --constant ε comprised from 2 to 2.5; and--

<u>Column 9, Claim 9, Line 40:</u>
"constant c comprised from 2 to 2.5; and" should read, --constant ε comprised from 2 to 2.5; and--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*